United States Patent
Prasad et al.

(10) Patent No.: US 6,287,603 B1
(45) Date of Patent: Sep. 11, 2001

(54) CYCLODEXTRIN FLAVOR DELIVERY SYSTEMS

(75) Inventors: Nikhil Prasad, New Milford, CT (US); David Straus, Albertson, NY (US); Glen Reichart, Southbury, CT (US)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/397,289

(22) Filed: Sep. 16, 1999

(51) Int. Cl.$^7$ .................................................. A61K 9/14
(52) U.S. Cl. ................................. 424/489; 424/439
(58) Field of Search ..................... 424/489, 488, 424/401, 439

(56) References Cited

U.S. PATENT DOCUMENTS

| | | | |
|---|---|---|---|
| 3,061,444 | 10/1962 | Rogers et al. | 99/140 |
| 3,140,184 | 7/1964 | Robbins | 99/28 |
| 3,816,393 | 6/1974 | Hayashi et al. | 260/209 |
| 3,846,551 | 11/1974 | Mifune et al. | 424/180 |
| 4,001,438 | 1/1977 | Marmo et al. | 426/96 |
| 4,024,223 | 5/1977 | Noda et al. | 424/180 |
| 4,054,736 | 10/1977 | Hayashi et al. | 536/103 |
| 4,073,931 | 2/1978 | Akito et al. | 424/298 |
| 4,228,160 | 10/1980 | Szejtli et al. | 424/180 |
| 4,247,535 | 1/1981 | Lewis et al. | 424/180 |
| 4,265,779 | 5/1981 | Gandolfo et al. | 252/135 |
| 4,268,501 | 5/1981 | Konno et al. | 424/80 |
| 4,296,137 | 10/1981 | Boden | 426/534 |
| 4,296,138 | 10/1981 | Boden | 426/534 |
| 4,348,416 | 9/1982 | Boden | 426/3 |
| 4,365,061 | 12/1982 | Szejtli et al. | 536/103 |
| 4,371,673 | 2/1983 | Pitha | 525/426 |
| 4,380,626 | 4/1983 | Szejtli et al. | 536/103 |

(List continued on next page.)

FOREIGN PATENT DOCUMENTS

2074838 * 11/1981 (GB).

OTHER PUBLICATIONS

Chen, Abstracts of Papers of the American Chemical Society, v. 206 (1–2), p. AGFD 135 (1993).

L. Szente and J. Szejtli, "Molecular Encapsulation of Natural and Synthetic Coffee Flavor With β–Cyclodextrin", Journal of Food Science, v. 51(4), p. 1024–27 (1986).

K. Lindner, "Using Cyclodextrin Aroma Complexes in the Catering", Die Nahrung, v. 26 (7–8), p. 675–680 (1982).

J. Szejtli, "Industrial Applications of Cyclodextrins", Inclusion Compounds, v. 3, p. 331–390 (1984).

József Szejtli, "Cyclodextrin Technology", Topics in Inclusion Science, P. 307–334.

Primary Examiner—James M. Spear
(74) Attorney, Agent, or Firm—Winston & Strawn (57) ABSTRACT

The invention relates to a process for preparing cyclodextrin inclusion complexes that increases the efficiency of the complexation so that a higher percentage of the active is recovered as a cyclodextrin inclusion complex. The process involves adding a cyclodextrin to a solvent in a reaction vessel, adding an active to the cyclodextrin solution with stirring, and allowing the mixture to stir for an appropriate amount of time and at a sufficient temperature to form an inclusion complex between the cyclodextrin and the active. A solids content increasing agent such as gum acacia, maltodextrin, modified dextrins, or mixtures thereof, is then added to the solution to increase the total solids content of the solution and the solution is at 25° C. and 40° C. and relative humidity of 53 percent dried to recover the cyclodextrin-active inclusion complex as a dry powder with the amount of active in the powder ranging from 1 to 20 percent by weight of the complex. The invention also relates to cyclodextrin inclusion complexes prepared by this process.

20 Claims, 7 Drawing Sheets

U.S. PATENT DOCUMENTS

| | | | |
|---|---|---|---|
| 4,438,106 | 3/1984 | Wagu et al. | 424/180 |
| 4,474,822 | 10/1984 | Sato et al. | 426/597 |
| 4,529,608 | 7/1985 | Szejtli et al. | 426/96 |
| 4,547,365 | 10/1985 | Kubo et al. | 424/71 |
| 4,560,571 | 12/1985 | Sato et al. | 426/594 |
| 4,596,795 | 6/1986 | Pitha | 514/58 |
| 4,616,008 | 10/1986 | Hirai et al. | 514/200 |
| 4,632,832 | 12/1986 | Okonogi et al. | 426/96 |
| 4,636,343 | 1/1987 | Shibanai | 264/118 |
| 4,663,316 | 5/1987 | Ninger et al. | 514/99 |
| 4,675,395 | 6/1987 | Fukazawa et al. | 536/103 |
| 4,728,510 | 3/1988 | Shibanai et al. | 424/94.5 |
| 4,732,759 | 3/1988 | Shibanai et al. | 424/94.61 |
| 4,751,095 | 6/1988 | Karl et al. | 426/548 |
| 5,571,782 | 11/1996 | Trinh et al. | 512/4 |
| 5,635,238 | 6/1997 | Trinh et al. | 426/650 |

* cited by examiner

CYCLODEXTRIN FLAVOR DELIVERY SYSTEMS

TECHNICAL FIELD

The present invention relates to a method for preparing cyclodextrin complexes of actives, such as flavors, perfumes, pharmaceuticals, and the like wherein a higher percentage of active is complexed with the cyclodextrin compared to conventional methods of making cyclodextrin complexes. The present invention also relates to the new cyclodextrin inclusion complexes, which can be prepared by the method.

BACKGROUND

The use of cyclodextrins as a complexing agent for materials is known. For example, the following U.S. Patents disclose the use of cyclodextrins to complex actives: U.S. Pat. Nos. 4,296,137, 4,296,138 and 4,348,416 to Borden (flavoring material for use in chewing gum, dentifrices, cosmetics, etc.); 4,265,779 to Gandolfo et al. (suds suppressors in detergent compositions); 3,816,393 and 4,054,736 to Hyashi et al. (prostaglandins for use as a pharmaceutical); 3,846,551 to Mifune et al. (insecticidal and acaricidal compositions); 4,024,223 to Noda et al. (menthol, methyl salicylate, and the like); 4,073,931 to Akito et al. (nitroglycerine); 4,228,160 to Szjetli et al. (indomethacin); 4,247,535 to Bernstein et al. (complement inhibitors); 4,268,501 to Kawamura et al. (anti-asthmatic actives); 4,365,061 to Szjetli et al. (strong inorganic acid complexes); 4,371,673 to Pitha (retinoids); 4,380,626 to Szjetli et al. (hormonal plant growth regulator), 4,438,106 to Wagu et al. (long chain fatty acids useful to reduce cholesterol); 4,474,822 to Sato et al. (tea essence complexes); 4,529,608 to Szjetli et al. (honey aroma), 4,547,365 to Kuno et al. (hair waving active-complexes); 4,596,795 to Pitha (sex hormones); 4,616,008 Hirai et al. (antibacterial complexes); 4,636,343 to Shibanai (insecticide complexes), 4,663,316 to Ninger et al. (antibiotics); 4,675,395 to Fukazawa et al. (hinokitiol); 4,732,759 and 4,728,510 to Shibanai et al. (bath additives); 4,751,095 to Karl et al. (aspartamane); 4,560,571 (coffee extract); 4,632,832 to Okonogi et al. (instant creaming powder) 5,571,782 and 5,635,238 to Trinh et al. (perfumes, flavors, and pharmaceuticals).

Cyclodextrins complexes are particularly desirable when the active is a flavoring material. By complexing the flavoring material with a cyclodextrin the flavor material is protected from degradation as a result of reactions induced by heat, light, and/or reaction with oxygen or other compounds. For example, γ-terpinene is a reactive terpene that is important in tangerine flavors. γ-terpinene is, however, easily oxidized to p-cymene which has an unpleasant kerosene note. By complexing the γ-terpinene with cyclodextrin the compound is protected from the adverse effects of oxygen and provides a flavor that is stable for a much longer period of time.

Complexing the flavoring material with a cyclodextrin also reduces loss of the flavor material by volatilization and/or sublimation. For example, diacetyl is a volatile compound that has a butter flavor. Due to its volatility the butter flavor is readily lost when food products containing diacetyl are heated. Complexing the diacetyl with cyclodextrin, however, leads to less butter flavor being lost when the food product is cooked in a microwave.

In addition, cyclodextrin complexes provide stable, standardized powders containing the active that are easy to use. Being a powder, the cyclodextrin complexes are easy to measure, handle, and store. The increased stability of the flavor when complexed with cyclodextrin provides a flavor material that can be stored longer. As a result of the improved stability measuring amounts of the flavor is more precise since the flavor content remains more constant over time. The longer storage times, easy handling, and simplicity of use all reduce costs and thus are of commercial importance in the food industry. A further economic benefit of using cyclodextrin complexes is that less of the cyclodextrin complex is needed to flavor food compared to the natural spice or flavor.

Yet another advantage of cyclodextrin complexes is that the natural material content of some flavors can be reduced by complexing the flavor component(s) with cyclodextrin and thus the risk of allergic reactions is minimized and the risk of microbial contamination is reduced.

The content of the flavor in conventional cyclodextrin complexes typically ranges from about 5 to 15 percent, and more often from 7 to 10 percent. Flavors typically consist of more than one component and while it is possible to complex all the components of the flavor composition with a cyclodextrin, generally only the more vulnerable components of the flavor composition are complexed. Specific flavors and or flavor enhancers include, for example, those disclosed in U.S. Pat. Nos. 4,348,416 and 5,571,782.

Specific examples of flavors complexed with cyclodextrin include: U.S. Pat. No. 4,560,571 to Sato et al. that discloses an instant beverage in which soluble flavors and aromatic components present in roasted coffee beans, roasted beans, or roasted cereal are complexed with cyclodextrins; U.S. Pat. No. 4,529,608 to Szejtli et al. that discloses a process for the preparation of honey powder that preserves the aroma substance of the honey by complexing the aroma components with cyclodextrin; U.S. Pat. No. 3,061,444 to Rogers et al. that discloses complexing meat and vegetable aromas with cyclodextrin; U.S. Pat. No. 4,001,438 to Marmo et al. that discloses peppermint cyclodextrin complexes for flavoring chewing gum; and U.S. Pat. No. 3,140,184 to Robbins et al. that discloses acetaldehyde/diethylacetate cyclodextrin complexes.

Complexing the flavor with cyclodextrin does not adversely effect the flavor, texture, or appearance of the food. In fact, in some instances the food texture may actually be improved by complexing the flavor with a cyclodextrin. For example, soups and drinks prepared from mixes may be beneficially thickened when the flavor is complexed with a cyclodextrin.

Cyclodextrins are obtained by the action of the enzyme cycloglycosyltransferase on starches. In dilute aqueous solutions the enzyme connects the naturally occurring helixes in starch to form 3-dimensional polyglucose rings or crowns. Cyclodextrins are polyglucose rings created with 6, 7, or 8 glucose units and are referred to as α, β, or γ cyclodextrins, respectively. The external part of the crown like structure consists of primary and secondary hydroxyl groups and is hydrophilic. The internal part of the crown consists mainly of carbon and hydrogen atoms and ether linkages and forms a hydrophobic cavity. This macrocyclic structure with a hydrophilic exterior and hydrophobic interior allows the cyclodextrin molecule to form inclusion complexes with a wide variety of chemically different compounds referred to herein as actives. The cyclodextrin behaves like a "host" that can accommodate, and release, the active or "guest" molecule.

A variety of methods are known to form cyclodextrin complexes. All these methods involve contacting the active with the cyclodextrin to form the complex. Typically, a warm aqueous solution of the cyclodextrin molecule is mixed with the active for sufficient time for the complex to form, followed by removal of the aqueous solvent. Alternatively, complexation can take place in an organic solvent or an aqueous solvent containing an organic cosolvent. Representative organic solvents include ethanol, isopropanol, acetone, and ethylacetate. In another method, the active is combined with a small amount of solvent to form a paste and the cyclodextrin and paste are kneaded together to form the complex, followed by drying the resulting complex. This method is commonly used when a high ratio of active to cyclodextrin is required. Once the cyclodextrin complex is formed a variety of methods are available to dry it. Typically, the complex is filtered to remove the solvent and air-dried, dried in a vacuum oven, or freeze dried. The complex may also be isolated by spray drying.

All of the methods for forming cyclodextrin complexes involve an equilibrium between the active complexed with the cyclodextrin, i.e., the complex, and the free active, i.e., the active not complexed with the cyclodextrin. Thus, a specific amount of free active is always present. When isolating the complex, any free active is lost during the filtering and/or drying steps, and thus, the efficiency of the process is much less than 100%. The efficiency of the process is measured as the percent yield for incorporation of the active, i.e., the amount of active recovered as a cyclodextrin complex divided by the starting amount of active. For example, the efficiency is generally only about 30 percent when cyclodextrin complexes are recovered by spray drying. Thus, when spray drying cyclodextrin complexes, substantially more than 50 percent of the active can be lost during the drying step. This loss of active increases the cost of the final product and is especially problematic for expensive actives.

Furthermore, the expense of cyclodextrins and thus the cost of the resulting cyclodextrin complexes have limited their commercial use. As a result, although cyclodextrin complexes of various actives have been disclosed and set forth in the art, their commercial use has been limited. Thus, there remains a need to reduce the cost of producing cyclodextrin complexes so that they can be commercially valuable. The present invention resolves this need.

SUMMARY OF THE INVENTION

The present invention relates to new higher loading cyclodextrin inclusion complexes containing one or more actives and to a process for preparing such complexes. The process comprises the steps of dissolving cyclodextrin in a solvent in a reaction vessel to form a first solution, adding the one or more actives to the first solution with stirring to form a second solution of the one or more actives and cyclodextrin, stirring the second solution for a sufficient amount of time and at a sufficient temperature to form inclusion complexes between the cyclodextrin and the one or more actives, adding a solids content increasing agent to the second solution to increase the solids content of the second solution and form a third solution, and drying the third solution to form the cyclodextrin inclusion complex as a dry powder.

The concentration of cyclodextrin in the second solution may be between about 5 and 40 percent and the ratio of active to cyclodextrin may be between about 0.001:1 and 100:1. The temperature of the second solution may be between about 4° C. and 75° C.

In one embodiment of the process the reaction vessel is sealed and the active is added without opening the reaction vessel. The reaction vessel may also be pressurized. The reaction vessel may be pressurized to a value of above atmospheric to about 1000 psi.

In another embodiment of the process, the second solution is stirred at a first temperature for a first length of time, the temperature of the second solution is then progressively lowered to one or more subsequent temperatures, and the lowered temperature of the second solution is maintained while the second solution is stirred.

The solids content increasing agent is preferably at least one of gum acacia, maltodextrin, or modified starch, and may be added to increase the solids content of the second solution to about 30 to 55 percent by weight of the solution. The solids content of the second solution may conveniently be increased by adding gum acacia in an amount of about 5 to 20 percent by weight of the solution and the remaining solids content increased by adding about 40 to 60 percent by weight of the solution of a maltodextrin having a dextrose equivalent of between about 5 and 10.

The active may be one or more pharmaceuticals, perfumes, or flavor components. Preferably, the flavor component can be dimethyl sulfide, methyl mercaptan, acetaldehyde, 2-methyl-3-furanthiol, diacetyl, flavors produced by pyrolysis, or mixtures thereof.

The invention also relates to cyclodextrin inclusion complexes prepared according to the process of the invention. The cyclodextrin inclusion complex may contain between about 1 and 20 percent by weight of the complex, and conveniently is above 15 percent by weight of complex. As noted above, the active in the cyclodextrin inclusion complex may be one or more flavors, perfumes, or pharmaceuticals.

BRIEF DESCRIPTION OF THE DRAWINGS

Preferred features of the invention can be understood from a review of the following detailed description and figures, wherein.

DETAILED DESCRIPTION OF THE PREFERRED EMBODIMENTS

The present invention is directed at a process for complexing actives with cyclodextrins. The process of the present invention increases the efficiency of the complexation so that a higher percentage of the active is recovered as a cyclodextrin inclusion complex. The invention is also directed at the product produced by the complexation process.

Any active can be complexed with cyclodextrin according to the invention, including but not limited to flavors, perfumes, and pharmaceuticals. The process is particularly suitable in connection with actives that are flavors and will be described predominately in that context. It is to be appreciated, however, that this is done for simplicity of description and the process is not limited to this application.

Useful actives and cyclodextrins for this invention can be found in U.S. Pat. No. 5,571,782, the content of which is expressly incorporated herein by reference thereto.

The process of the invention involves adding a cyclodextrin to a solvent in a reaction vessel, adding an active to the cyclodextrin solution with stirring and without opening the sealed reaction vessel, and allowing the mixture to stir for an appropriate amount of time and at a sufficient temperature to form an inclusion complex between the cyclodextrin and the active. A solids content increasing agent is then added to the solution to increase the solids content of the solution and the solution is spray dried to recover the cyclodextrin-active inclusion complex as a dry powder.

The reaction vessel may be sealed or unsealed. Preferably the reaction vessel is sealed to avoid the loss of any volatile components.

Any solids content increasing agent may be used, including but not limited to, maltodextrins and low dextrose equivalent corn syrup solids (5, 10, 15 and 20 DE); enzyme modified starches, oxidized starches (for example starch oxidized with hypochlorite or periodate); amino acid substituted corn starch derivatives (for example, periodate-oxidized corn starch, amylase-dextrinized corn starch, and corn starch covalently attached to phenylalanine glycoamine); oligosaccharides from alpha-amylase modified starches of wheat, maize, rice, amylomaize, corn, waxy corn, cassava, and Potato; octenylsuccinate treated starch; hydrocolloids (for example, gum acacia, xanthan, guar, locust bean, tragacanth, and carrageenan); and proteins (for example, milk powder, whey, and soy). Preferably the solids content increasing agent, is gum acacia, maltodextrin, modified dextrins, or mixtures thereof According to the invention, any cyclodextrin that forms a complex with the active can be used. Typically the cyclodextrin is an α- or β- or γ-cyclodextrin. Any solvent can be used that dissolves the cyclodextrin, however, the preferred solvent is water. A co-solvent, such as ethanol or isopropyl alcohol may be added to the water. Typically, when a cosolvent is used it is added to water in an amount of about 1 or 2 percent.

The concentration of cyclodextrin in the solution is preferably between about 5 percent to 40 percent by weight and preferably between about 15 percent and 20 percent by weight. It is, however, not necessary that all of the cyclodextrin be dissolved when it is added to the solvent. It is satisfactory for an equilibrium to be established between dissolved and undissolved cyclodextrin. In general, the concentration of cyclodextrin in solution increases with increasing temperature.

The mixture is typically stirred at a rate of between about 300 rpm and 1500 rpm, preferably 300 to 500 rpm. The higher the agitation rate the faster the rate of formation of the cyclodextrin-active inclusion complex. The stirring rate, however, cannot be so high as to create sufficient shear to breakdown the cyclodextrin molecules. Thus, the stirring rate should be as high as possible without damaging the cyclodextrin molecules.

The active is introduced into the stirred Solution of cyclodextrin. Preferably the active is introduced to a sealed reaction vessel without opening the reaction vessel. Generally the active is pumped into the reactor in pure form or as a solution and the lines of the flavor delivery system are rinsed with solvent. When the active is added as a solution it is preferably added at the highest concentration possible. Preferably, the concentration of active in the solution is greater than 50 percent by weight and more preferably greater than 80 percent by weight. When the active is a flavor the preferred solvents for the flavor are oil-based, fixed oil, triacetin, or water. The concentration of active present in the resulting solution is determined by the flavor load that is desired in the final product. The necessary concentration of active in the final solution can readily be determined by one of ordinary skill in the art with routine experimentation. Typically, the flavor load of the active in the final product is between 1 and 20 percent, preferably between 2 and 10 percent. Generally, the mole ratio of active to cyclodextrin in the resulting solution is between about 0.001:1 and about 100:1, preferably, between about 0.01:1 and 10:1, and more preferably between about 0.2:1 and 1:5.

The temperature of the solution is generally between about 4° C. and 75°C, preferably between about 10° C. and 40° C., and more preferably between about 12° C. and 30° C. The time for forming the complex is typically between 15 minutes and about 24 hours, preferably between 1 hour and 10 hours. In general the higher the temperature the shorter the reaction time. Without wishing to be bound by theory it is believed that the shorter reaction times at higher temperatures is due to more of the cyclodextrin being dissolved in the solvent at higher temperatures. Typical reaction times are 4 hours at 25° C.

In another embodiment of the invention complexation can be initiated with stirring at a high temperature followed by progressively lowering the temperatures. Applicants have, unexpectedly found that formation of the inclusion complex is more efficient when the temperature of the solution is varied. Formation of the inclusion complex can be more efficient when the complexation is initiated with stirring at a high temperature followed by progressively lower temperatures. For example the mixture may be held under constant agitation for 1 hour at 75° C. followed by 3 hours at 25° C. and 20 hours at 11° C.

Applicants have also unexpectedly discovered that the efficiency of inclusion complex formation may be increased if the reaction vessel is maintained under a positive pressure. Thus, in one embodiment of the invention the formation of the inclusion complex takes place under positive pressure. The pressure can be increased to any value, however, the pressure is typically above atmospheric and up to as high as about 1000 psi (68 bar), more preferably up to about 100 psi (6.8 bar). Increasing the pressure during complexation is particularly beneficial when the active is volatile.

Once the formation of the inclusion complex is complete the total solids content of the resulting slurry is increased to about 30 to 55 percent by weight, preferably 35 to 41 percent by weight by adding a solids content increasing agent, i.e., gum acacia, maltodextrin, modified dextrins, or mixtures thereof. Preferably, gum acacia is added in an amount between about 5 to 20 percent by weight, preferably about 7 to 15 percent by weight, and more preferably about 8 to 10 percent by weight and the remaining solids content is made up with maltodextrin having a dextrose equivalent (DE) of between about 5 and 10. The maltodextrin is added in an amount of between about 30–80% by weight, preferably 40–60% by weight. The resulting mixture is then dried preferably by using conventional spray drying techniques that are well known to those of ordinary skill in the art.

The dried cyclodextrin complexes produced according to the process of the present invention have a higher percent of active complexed with the cyclodextrin than if the cyclodextrin complex was prepared by traditional methods such as filtering the cyclodextrin inclusion complex and freeze drying or vacuum drying the filtrate, or spray drying a solution of the cyclodextrin inclusion complex without the addition of the solids content increasing agent of gum acacia, maltodextrin, modified dextrins, or mixtures thereof. Similarly, the process of the present invention complexes a significantly higher percentage of active compared to traditional spray drying process that do not involve forming cyclodextrin inclusion complexes but merely adsorbs the active on the surface of or encapsulates the active in the pores of a solid particle such as gum acacia, maltodextrin, or modified dextrins. The increased efficiency is particularly evident when the active is volatile. For example, when the active is dimethyl sulfide typical spray drying has an efficiency of only about 8 percent and spray drying a cyclodextrin inclusion complex without gum acacia, maltodextrin, modified dextrins, or mixtures thereof has an efficiency of about 33 percent. According to the process of the present invention, however, wherein the cyclodextrin inclusion complex is spray dried with gum acacia, maltodextrin, modified dextrins, or mixtures thereof the efficiency of the process is better than 75 percent. Thus, the process of the present invention recovers more of the active in the form of an inclusion complex compared to other methods of encapsulating actives and results in less of the active being loot.

Without wishing to be bound by theory it is believed that the increased efficiency is the result of a second coating of gum acacia, maltodextrin, modified dextrins, or mixtures thereof forming on the cyclodextrin-active inclusion complex. The increased efficiency may also be partly due to free active, i.e., active not complexed with cyclodextrin, being adsorbed onto the surface of or encapsulated in the pores of the gum acacia, maltodextrin, modified dextrins, or mixtures thereof.

As a result of the improved efficiency less active is required at the start of the process to prepare a final cyclodextrin inclusion complex having a specified amount of flavor complexed therein. Similarly, for a given starting amount of active the process of the present invention produce a cyclodextrin inclusion complex that has a higher percent of active complexed therein compared to other processes of preparing cyclodextrin inclusion complexes. As a result of the increased amount of active in the inclusion complex less of the final material is needed to have a given effect, such as producing an aroma in a perfume or a flavor in a food. This increased efficiency means that the cost of producing cyclodextrin inclusion complex is significantly reduced such that the process becomes cost effective and commercially practical.

The process of the present invention is particularly economical for expensive actives or actives that are volatile. Moreover, the process of the present invention can be used to form an inclusion complex with only a specific component of a flavor or aroma composition, for example, and to then dry blending the resulting complex back with the other components of the composition. Preferably, the specific component is a volatile component of the flavor or aroma composition or a component that is subject to degradation on exposure to air, light, oxygen, or other compounds.

Among flavor components, the process of the invention is particularly useful for forming cyclodextrin complexes with dimethyl sulfide, methyl mercaptan, acetaldehyde, 2-methyl-3-furanthiol, and diacetyl. Similarly, the process of the present invention is particularly useful to form cyclodextrin complexes with pyrolyzed flavors. Pyrolyzed flavors are free fatty acids that are pyrolyzed at a high temperature and provide a grilled or fatty note to foods. A problem with pyrolyzed flavors is that they are unstable in the presence of hydrolyzed plant proteins, however, if the pyrolyzed flavors are complexed in a cyclodextrin inclusion complex their stability in the presence of hydrolyzed plant proteins is improved significantly.

By flavor component is meant any compound or mixture of compounds that contribute to the overall flavor perception. Flavor components include, but are not limited to, those listed in the 21 FEMA GRAS list, the Codex Alimentarius list, or any other reliably published list, spices, oleoresins, flavor enhancers, and the like The invention is also directed at a composition prepared according to the method described above. The composition comprises one or more actives in a powdered form wherein at least a portion of the active is complexed with cyclodextrin and the cyclodextrin is coated with gum acacia, maltodextrin, modified starch, or mixtures thereof. The active may be a flavor, perfume, pharmaceutical, and the like.

The active typically comprises between about 1 and 20 percent by weight of the complex, and often greater than 15% of the complex.

The cyclodextrin complexes of the present invention show the same flavor release and stability as other encapsulated flavors.

EXAMPLES

The invention is further defined by reference to the following examples describing in detail the methods of the present invention. The examples are representative, and should not be construed to limit the scope of the invention in any way.

Complexes of flavor systems having a beef flavor (BEEF FLAVOR 1.123.20, commercially available from FIS USA of Solon, OH), chicken flavor (CHICKEN FLAVOR 2.01.03, commercially available from FIS USA of Solon, Ohio), grilled flavor (GRILLED FLAVOR 4.24.20, commercially available from FIS USA of Solon, Ohio), shrimp flavor (SHRIMP FLAVOR 5.58.21, commercially available from FIS USA of Solon, Ohio), pyrolyzed flavor (FLAVOR 8251-0, commercially available from FIS USA of Solon, Ohio) and a tomato flavor (TOMATO BOOSTER 008 7.70.28, commercially available from FIS USA of Solon, Ohio) were complexed with β-cyclodextrin according to the process described below.

Figure 1:
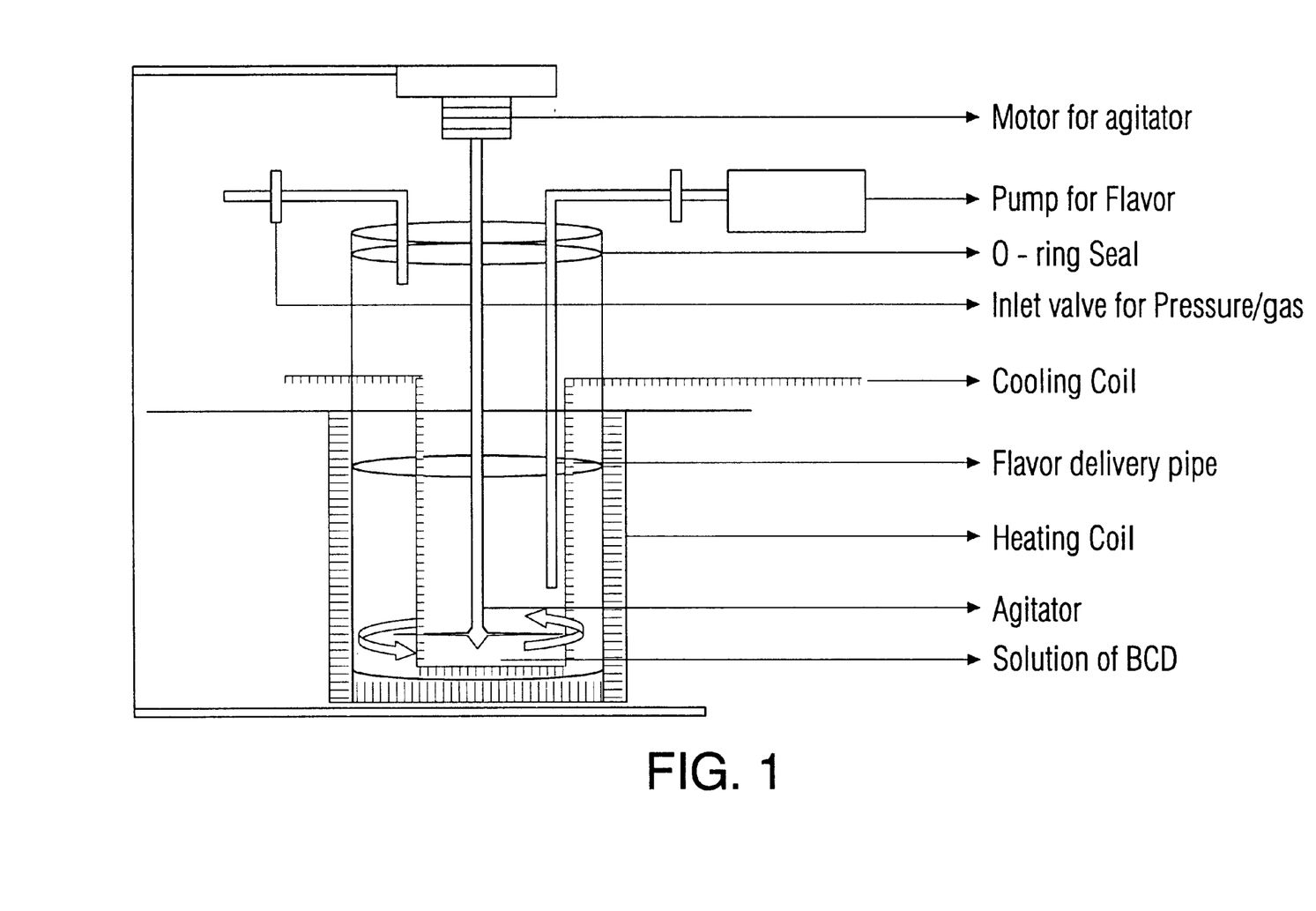
FIG. 1 is a schematic drawing of a reaction vessel for preparing cyclodextrin complexes according to the present invention.

Complexes were formed in a 4-liter reactor vessel that had an agitator and temperature control. The reactor vessel is depicted in FIG. 1. The agitation speed was set at 1500 rpm. 1 liter of a 15% solution of β-cyclodextrin (Cavitron™, commercially available from Cerestar of Hammond, Ind.) was heated to 75° C. and transferred to the reactor vessel. A neat solution of a compounded flavor or a solution of a compounded flavor, having more than about 30 percent by weight of the flavor, was then pumped into the reactor vessel. The container holding the flavor was rinsed with 100 ml of water and the water pumped into the reaction vessel. The sample was continually stirred at 1500 rpm for 1 hour at 75° C. followed by 3 hours at 25° C. and 20 hours at 11° C. At the completion of the reaction the sealed reactor vessel was opened and the total solids of the slurry was increased to 35–41%. This was done by adding 8–10% gum acacia (SPRAY GUM C, commercially available from Colloides Natureles Inc. of Bridgewater, N.J.) and the remaining solids content was made up with Maltodextrin 5–10 DE (MALTRIN 040, commercially available from GPC of Muscatine, Iowa). The resulting slurry was spray dried using conventional spray drying techniques.

The amount of flavor component in the inclusion complex was determined using headspace gas chromatographic (GC) analysis with a PE8500 gas chromatograph (commercially available from Perkin Elmer of Norwalk, Conn.) equipped with a flame ionization detector. The amount of flavor component was determined based on the peak response of key marker molecules for each flavor. External standards were used to establish retention times for marker molecules.

The following analytical procedure was followed to determine the amount of flavor component in each sample: Samples for analysis were prepared by dissolving 100 mg of the inclusion complex or 25 mg of the inclusion complex formed from tomato flavor in 1 mL of water in a 20 mL air tight vial. The samples were placed in a PE101 Autosampler (commercially available from Perkin Elmer of Norwalk, Conn.) and heated to 80° C. 2 μL of static headspace samples was injected onto a 75 m×0.53 mm×3-micron J&W DB624 column (commercially available from J&W Scientific Co. of Folsom, Calif.). The following chromatographic conditions were used: initial temperature of 70° C. with a hold time of 3 minutes followed by a linear temperature gradient from 70° C. to 150° C. at rate of 10° C./minute and holding for 12 minutes at 150° C. followed by a second linear temperature gradient from 150° C. to 230° C. at a rate of 10° C./minute and holding for 12 minutes at 230° C. The total run time was 43 minutes. Peak responses were determined using an electronic integrator.

Example 1. Comparison of the Process of the Present Invention with Other Methods of Encapsulating Flavors.

Tomato flavor was complexed with β-cyclodextrin according to the process described above and the amount of the marker molecule dimethyl sulfide (DMS) in the inclusion complex was determined by headspace GC analysis. For comparative purposes tomato flavor was also complexed with β-cyclodextrin according to the process described above except that gum acacia and maltodextrin were not added to increase the solids content before spray drying. To compare the process of the present invention with conventional spray drying techniques tomato flavor was also encapsulated by spray drying with gum acacia and maltodextrin alone. In this experiment the process described above was followed except that maltodextrin was substituted for cyclodextrin during complexation and the resulting slurry was spray dried.

Figure 2:
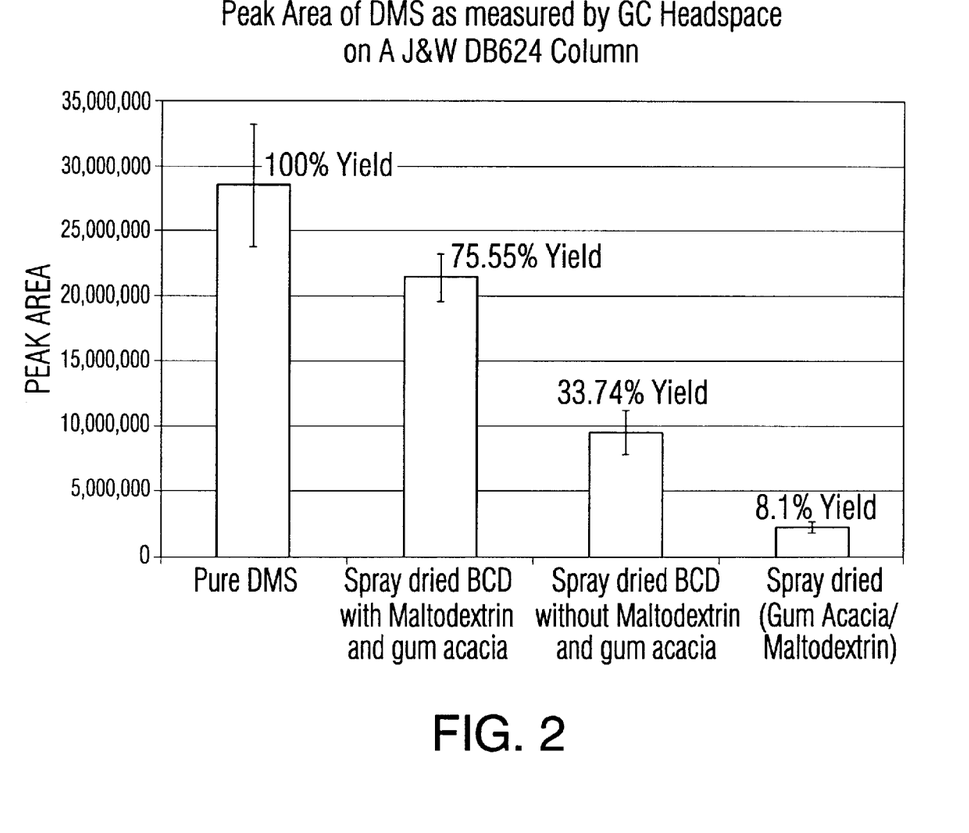
FIG. 2 is a graph comparing the efficiency of the process of the present invention for complexing tomato flavor with cyclodextrins with the efficiency of several other methods of complexing or encapsulating tomato flavor.

The efficiency of the process according to the present invention was 75 percent. The efficiency of spray drying the cyclodextrin inclusion complex without gum acacia and maltodextrin was only 33 percent and the efficiency of encapsulation by spray drying with gum acacia and maltodextrin alone was only 8 percent. FIG. 2 provides this data graphically. The results show that the process of the present invention is much more efficient than conventional methods of encapsulating flavor components.

Example 2. Comparison of Spray Drying β-cyclodextrin Complexes with Gum Acacia and Maltodextrin with Other Methods of Drying β-cyclodextrin Inclusion Complexes.

For comparative purposes tomato flavor was complexed with β-cyclodextrin according to the process described above except that the slurry was filtered and dried in a vacuum oven at 40° C. for 12 hours and a pressure of 30 inches of Hg or by freeze drying. Freeze drying was done using a VIRTIS 50-SRC Freeze-dryer (commercially available from Virtis Co. of Gardiner, N.Y.). The material was freeze dried using the following cycle: freezing the sample at −36° C. for 3 hours, applying a vacuum of 150 millitorr, increasing the temperature to 25° C. at a rate of 3° C. per hour, and releasing the pressure. Four cycles were performed to dry each sample. Table 1 shows the effect of the different drying methods on peak area of impact flavor compounds entrapped in β-cyclodextrin.

TABLE 1

Effect of Different Drying Methods on Peak Area of Impact Flavor Compounds Entrapped in β-cyclodextrin with Tomato Flavor

| Flavor Molecule | Vacuum drying at 40° C. (arbitrary units) | Freeze drying (arbitrary units) | Spray drying (arbitrary units) |
| --- | --- | --- | --- |
| Dimethyl sulfide | 881,024 | 7,635,105 | 8,852,907 |
| Cis-3-hexenol | 7,910 | 31,858 | 29,941 |
| 2-isobutyl thiazole | 7,734 | 14,076 | 16,912 |
| Phenylethyl alcohol | 324 | 204 | 368 |
| β-damescenone | 61,107 | 128,022 | 164,493 |

The results show that the spray drying process of the present invention is more efficient than oven drying and similar to freeze-drying. The high cost of freeze drying, however, makes the process of the present invention more economical than freeze-drying.

Example 3. Effect of Complexation Temperature and Time.

Tomato flavor was complexed with β-cyclodextrin as described in above. In a separate experiment tomato flavor was complexed with β-cyclodextrin according to the procedure described above except that the temperature during the 24-hour complexation period was maintained at 25° C. Results are provided in Table 2.

TABLE 2

Effect of Complexation Temperature on Peak Areas of Impact Flavor Compounds Entrapped in β-cyclodextrin with Tomato Flavor

| Flavor Molecule | Entrapment at 25° C. for 24 hrs. (arbitrary units) | Entrapment at 75° C. for 1 hr., 25° C. for 3 hrs., and 11° C. for 20 hrs. (arbitrary units) | Percent Increase |
|---|---|---|---|
| Dimethyl sulfide | 3,342,209 | 7,635,105 | 56 |
| Cis-3-hexenol | 11,623 | 31,858 | 64 |
| 2-isobutyl thiazole | 7,978 | 14,076 | 43 |
| Phenylethyl alcohol | 150 | 204 | 26 |
| β-damescenone | 115,533 | 128,022 | 10 |

The results indicate that the process is more efficient when complexation in a sealed vessel is conducted at a high temperature followed by cooling than when complexation is conducted at a single temperature.

Example 4. Effect of Pressure on Efficiency of Complexation.

The effect of pressure on the efficiency of complexation was evaluated by completing the components of tomato flavor with β-cyclodextrin according to the process described above. The complexation was conducted at atmospheric pressure, 100 psi, and 1000 psi. Table 3 shows that increasing the pressure improves the efficiency of the process, as measured by peak area from GC headspace, for dimethyl sulfide and isobutyl thiazole. Table 3 also shows that for β-damescenone and cis-3-hexenol increasing the pressure initially led to an increase in the amount of flavor completed with the cyclodextrin but the effect leveled off. For phenylethyl alcohol, however, an increase in pressure led to a decrease in the amount of flavor complexed with the cyclodextrin with. The results demonstrate that increasing the pressure can improve the efficiency of complexation for some flavor components. The improvement in efficiency is most pronounce for highly volatile compounds like dimethyl sulfide.

TABLE 3

Effect of Complexation Pressure on Peak Areas of Impact Flavor Compounds Entrapped in β-cyclodextrin with Tomato Flavor

| | Amount Entrapped at Atmospheric Pressure (arbitrary units) | Amount Entrapped at a 100 psi (arbitrary units) | Amount Entrapped at 1000 psi (arbitrary units) |
|---|---|---|---|
| Dimethyl sulfide | 6,903,774 | 8,914,755 | 9,577,128 |
| Cis-3-hexenol | 25,638 | 37,636 | 36,863 |
| 2-isobutyl thiazole | 13,622 | 15,065 | 16,157 |
| Phenylethyl alcohol | 553 | 440 | 199 |
| β-damescenone | 133,786 | 142,919 | 138,858 |

Example 5. Comparison of Flavor Quality for Flavors Complexed with β-Cyclodextrins According to the Process of the Present Invention with Flavors Spray Dried with Gum Acacia and Maltodextrin.

Samples of tomato, shrimp, and chicken flavor were complexed with β-cyclodextrins as described above. For comparison samples were also encapsulated by conventional spray drying of these flavors with gum acacia and maltodextrin. Conventional spray drying of these flavors was performed as described in Example 1 for tomato flavor. The encapsulated flavors were added to a dehydrated TRIO™ system (commercially available from Nestle Food Services of Solon, Ohio) to produce a base flavor system. The TRIO™ system is a neutral flavored powder for preparing sauces. The base flavor systems were prepared by adding the chicken and shrimp complexes to the TRIO™ system at a 10 percent level and by adding the tomato complex at a 5 percent level. The base flavor systems were then rehydrated with hot water (100° C.) and tasted by a technical screening panel. Bases containing the chicken and shrimp complexeo were tasted as a 2 percent solution in hot water and bases containing the tomato flavor were tasted as a 4 percent solution in hot water.

The technical screening panel had a minimum of eight members at each tasting session. A 10-point intensity scale was used to judge the intensity of flavors with 0 indicating a dislike of the flavor and 10 indicating an extreme liking of the flavor. Samples were first evaluated by the panel and an arbitrary unit was chosen on the 10 point scale to rate the model system which was fresh spray dried powder. An arbitrary unit was also chosen to rate the spray-dried powder and the flavor complexed with β-cyclodextrin, which compared these flavors relative to the model system. These values were designated as time zero values for each flavor. Further evaluations were based on this scale. At each new evaluation the screening panel was provided with the model system and the unit value that was assigned to the model system, samples were than rated on the 10-point scale relative to the model system.

Figure 3:
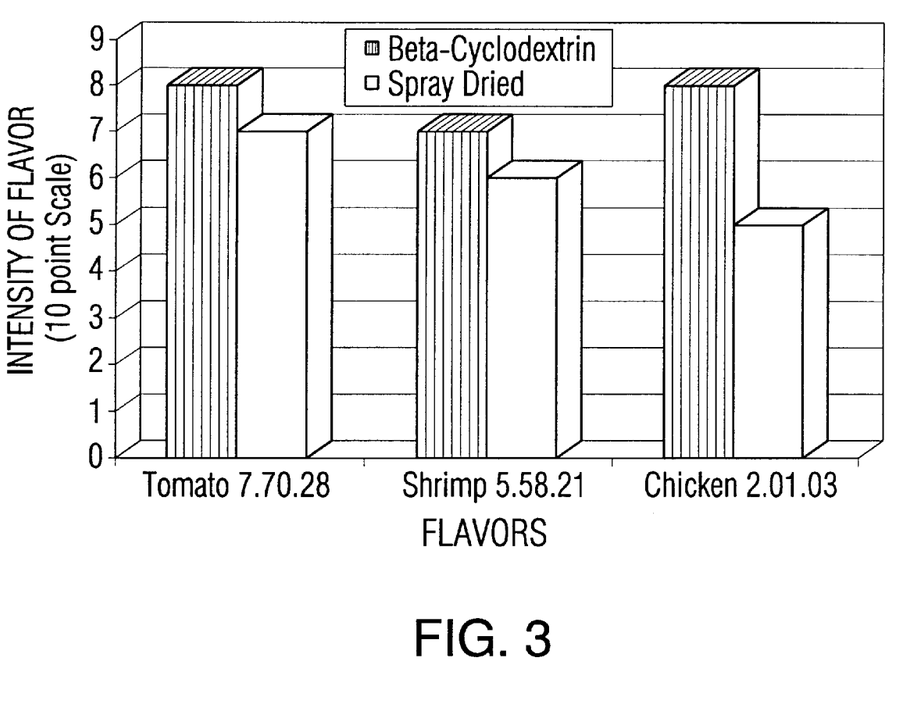
FIG. 3 is a graph representing the results of a technical screening panel that compared the quality of tomato, chicken, and shrimp flavors complexed with cyclodextrin according to the process of the present invention with those flavors encapsulated by conventional spray drying.

FIG. 3 shows the result of the technical screening panel for tomato, chicken, and shrimp flavors. The results show that upon rehydration the flavor complexed with β-cyclodextrin according to the present invention performed equal to or better than their spray dried counterpart.

Figure 4:
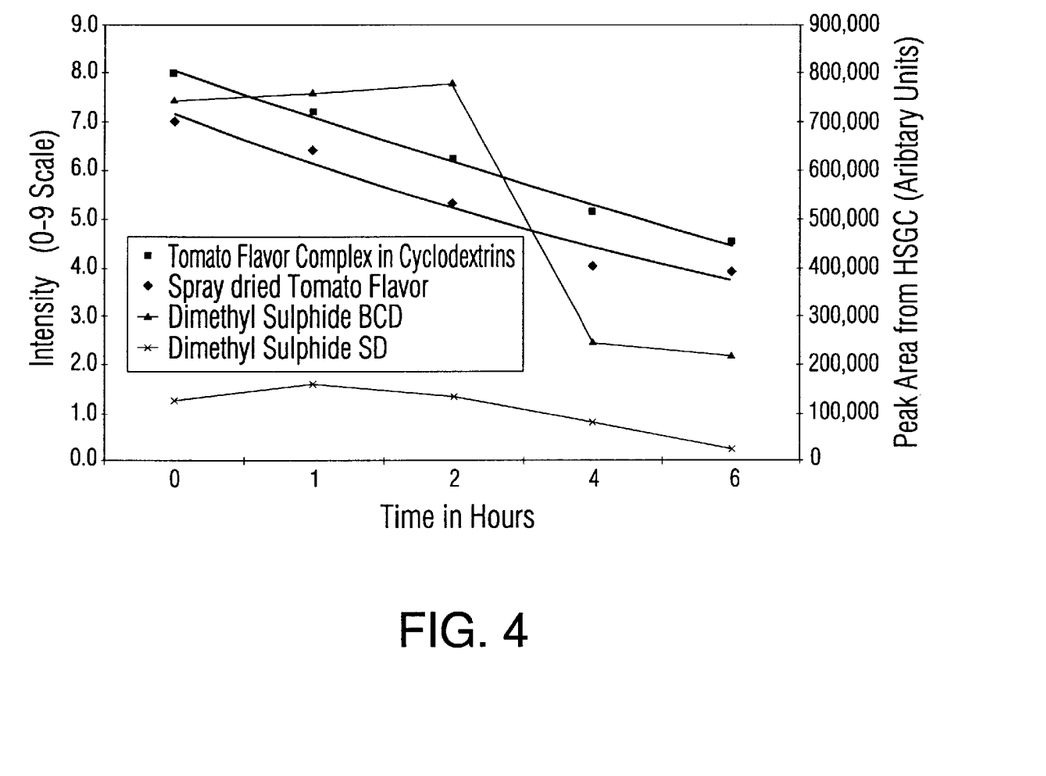
FIG. 4 is a graph representing the results of a technical screening panel that compared the quality of tomato flavor complexed with cyclodextrin according to the process of the present invention with tomato flavors encapsulated by conventional spray drying as a function of time.
Figure 5:
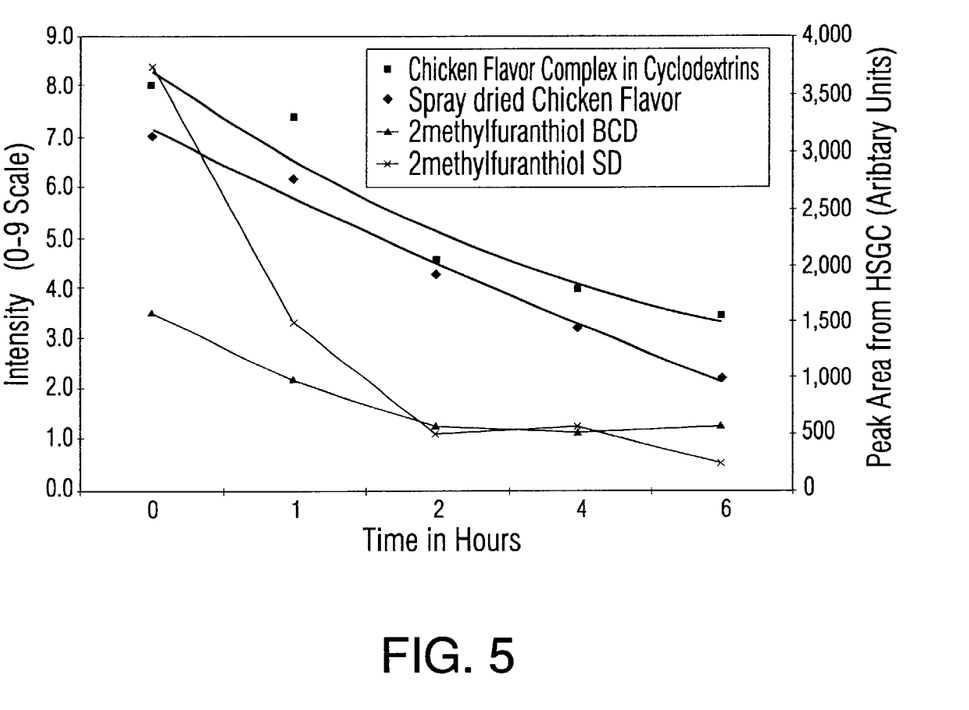
FIG. 5 is a graph representing the results of a technical screening panel that compared the quality of chicken flavor complexed with cyclodextrin according to the process of the present invention with chicken flavor encapsulated by conventional spray drying as a function of time.
Figure 6:
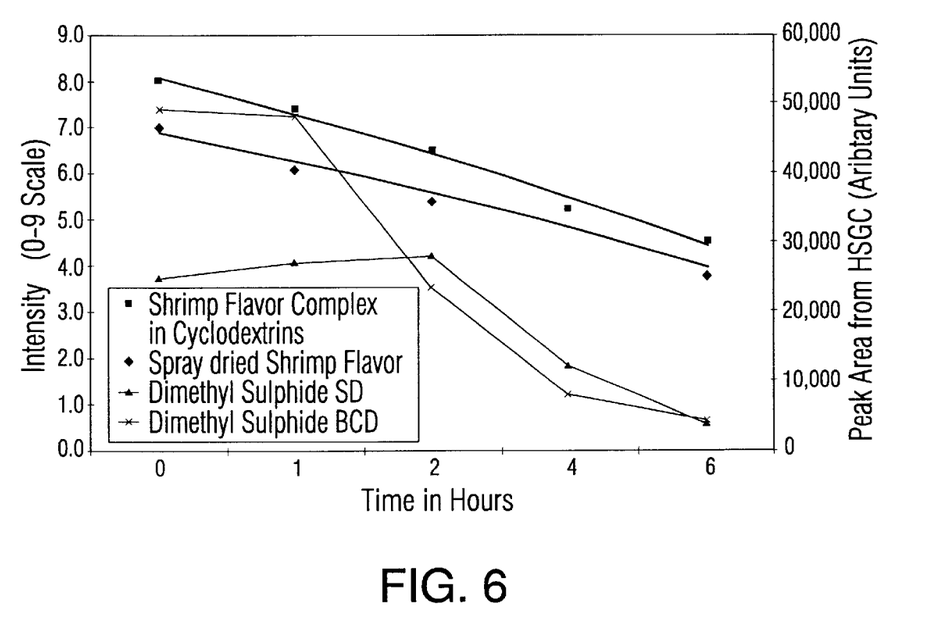
FIG. 6 is a graph representing the results of a technical screening panel that compared the quality of shrimp flavor complexed with cyclodextrin according to the process of the present invention with shrimp flavor encapsulated by conventional spray drying as a function of time.

The same samples were also held at 160° F. (70° C.) for 6 hours and tasted every hour by the panel. A fresh reference sample was prepared for each hourly session. The results of the panel as a function of time are shown in FIGS. 4–6 for tomato, chicken, and shrimp flavors, respectively. The results show that even though the intensity scores for the β-cyclodextrin flavor complexes were overall slightly better after 6 hours compared to the flavor prepared by conventional spray drying, the degradation slopes for both the β-cyclodextrin flavor complexes and the spray dried complexes were about the same. This shows that the β-cyclodextrin flavor complexes release their flavor at the same rate as flavors encapsulated by traditional spray drying. The better score by the panel after 6 hours is the result of more flavor being incorporated into β-cyclodextrin flavor complex at the start.

Example 6. Stability of β-Cyclodextrin Flavor Complexes.

Samples of tomato, beef, and chicken flavor were complexed with β-cyclodextrins as described above. For comparison samples were also encapsulated by conventional spray drying of these flavors with gum acacia and maltodextrin following the procedure described in Example 1 for tomato flavor. Samples were then stored at of temperature of 25° C. or 40° C. in a desiccator containing a saturated solution of magnesium nitrate to control the relative humidity at a level of 53%. The 40° C. samples were evaluated by headspace chromatography at 1 week intervals for 8 weeks and the 25° C. samples were evaluated at the 3 and 5 month intervals. Samples were also evaluated by the technical panel at time zero and after 8 weeks for samples stored at 40° C. and after 3 months for samples stored at 25° C.

Figure 7:
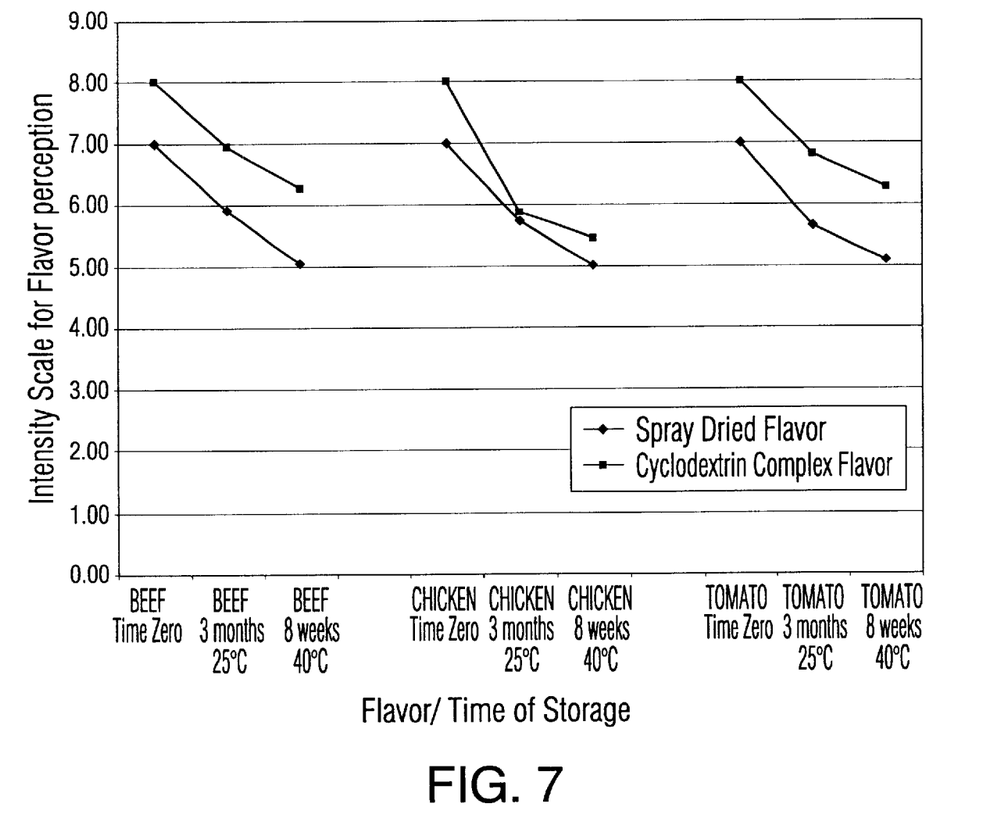
FIG. 7 is a graph representing a comparison of the stability of tomato, chicken, and shrimp flavors complexed with cyclodextrin according to the process of the present invention with those flavors encapsulated by conventional spray drying after storage at 25° C. or 40° C. and relative humidity of 53 percent.

FIG. 7 shows the results of the technical panel for each flavor. Again it was observed that the β-cyclodextrin flavor complexes had a higher flavor intensity compared to their spray-dried counterparts. This, higher intensity for the β-cyclodextrin flavor complexes is again attributed to the fact that there was more flavor incorporated into β-cyclodextrin flavor complex at the start.

What is claimed is:

1. A process for preparing cyclodextrin inclusion complexes of one or more actives comprising the steps of:
    dissolving cyclodextrin in a solvent in a reaction vessel to form a first solution;
    adding one or more actives to the first solution with stirring to form a second solution of the one or more actives and cyclodextrin;
    stirring the second solution for a sufficient amount of time and at a sufficient temperature to form inclusion complexes between the cyclodextrin and the one or more actives;
    adding a solids content increasing agent to the second solution to form a third solution having an increased solids content; and
    drying the third solution to form dry powder cyclodextrin inclusion complexes containing the actives in an amount of about 1 to 20 percent by weight of the complex.

2. The process of claim 1 wherein the solids content increasing agent is at least one of gum acacia, maltodextrin, modified starch, or mixtures thereof.

3. The process of claim 1 wherein the concentration of cyclodextrin in the second solution is between about 5 and 40 percent and the ratio of active to cyclodextrin is between about 0.001:1 and 100:1.

4. The process of claim 1 wherein the temperature of the second solution is between about 4° C. and 75° C.

5. The process of claim 1, wherein the reaction vessel is sealed and wherein the one or more actives are added without opening the reaction vessel.

6. The process of claim 1 further comprising pressurizing the reaction vessel.

7. The process of claim 6 wherein the reaction vessel is pressurized to a value of above atmospheric to about 1000 psi.

8. The process of claim 1 further comprising stirring the second solution at a first temperature for a first length of time, progressively lowering the temperature of the second solution to one or more subsequent temperatures, and maintaining the lowered temperature of the second solution while stirring.

9. The process of claim 1 wherein the solids increasing agent is added to the second solution to form a third solution having an increased solids content of about 30 to 55 percent by weight of the solution.

10. The process of claim 9 wherein the solids content of the second solution is increased by adding gum acacia in an amount of about 5 to 20 percent by weight of the solution and by adding maltodextrin having a dextrose equivalent of between about 5 and 10 in an amount of about 40 to 60 percent by weight of the solution.

11. The process of claim 1 wherein the active is one or more pharmaceuticals or perfumes.

12. The process of claim 1 wherein the active is one or more flavor components.

13. The process of claim 12, wherein the one or more flavor components is dimethyl sulfide, methyl mercaptan, acetaldehyde, 2-methyl-3-furan thiol, diacetyl, a pyrolyzed flavor, or mixtures thereof.

14. A cyclodextrin inclusion complex prepared according to the process of claim 1.

15. The cyclodextrin inclusion complex of claim 14 wherein the active is one or more flavors, perfumes, or pharmaceuticals.

16. The cyclodextrin inclusion complex of claim 15 wherein the active is dimethyl sulfide, methyl mercaptan, acetaldehyde, 2-methyl-3-furan thiol, diacetyl, a pyrolyzed flavor, or mixtures thereof.

17. The cyclodextrin inclusion complex of claim 14 wherein the solids increasing agent is at least one of gum acacia, maltodextrin, or modified starch.

18. A cyclodextrin inclusion complex comprising a solids content increasing agent and at least one active of dimethyl sulfide, methyl mercaptan, acetaldehyde, 2-methyl-3-furan thiol, diacetyl, or a pyrolyzed flavor, or a mixture thereof, in an amount of about 1 to 20 percent by weight of the complex.

19. The cyclodextrin inclusion complex of claim 18 wherein the active is one or more flavors, perfumes, or pharmaceuticals.

20. The cyclodextrin inclusion complex of claim 18 wherein the solids increasing agent is at least one of gum acacia, maltodextrin, or modified starch.

* * * * *